US006871476B2

(12) United States Patent
Tobolka

(10) Patent No.: US 6,871,476 B2
(45) Date of Patent: Mar. 29, 2005

(54) HEAT SEALING AND CUTTING MECHANISM AND CONTAINER FORMING APPARATUS INCORPORATING THE SAME

(76) Inventor: Stefan Tobolka, 2146 Olde Base Line Road, Ingelwood, Ontario (CA), L0N 1K0

( * ) Notice: Subject to any disclaimer, the term of this patent is extended or adjusted under 35 U.S.C. 154(b) by 0 days.

(21) Appl. No.: 10/010,798

(22) Filed: Nov. 13, 2001

(65) Prior Publication Data
US 2002/0139084 A1 Oct. 3, 2002

Related U.S. Application Data

(60) Provisional application No. 60/247,358, filed on Nov. 13, 2000.

(51) Int. Cl.[7] ............................. B65B 9/20; B65B 51/30
(52) U.S. Cl. .................... 53/374.2; 53/552; 493/194; 493/209
(58) Field of Search ........................... 53/371.2, 371.8, 53/374.2, 374.8, 552; 219/633; 156/380.2, 380.3, 380.6; 493/194, 206, 209

(56) References Cited

U.S. PATENT DOCUMENTS

| 3,874,976 A | * | 4/1975 | MacFarland, Jr. ........... 156/515 |
|---|---|---|---|
| 4,075,818 A | * | 2/1978 | Wright et al. .............. 53/374.8 |
| 4,079,570 A | * | 3/1978 | Rucker ....................... 493/206 |
| 4,288,968 A | * | 9/1981 | Seko et al. ................ 53/374.2 |
| 4,551,965 A | * | 11/1985 | Prottengeier ............... 53/374.2 |
| 4,747,253 A | * | 5/1988 | Schulte ........................ 53/433 |
| 4,807,426 A | * | 2/1989 | Smith ........................ 53/374.2 |
| 4,961,302 A | * | 10/1990 | Davis ........................ 53/374.2 |
| 5,067,302 A | * | 11/1991 | Boeckmann ............... 53/374.8 |
| 5,247,779 A | * | 9/1993 | Wirsig et al. .............. 53/374.2 |
| 6,041,580 A | * | 3/2000 | Wojtech ...................... 53/551 |

FOREIGN PATENT DOCUMENTS

| EP | 0 995 683 | 4/2000 |
|---|---|---|
| WO | WO 97/19852 | 6/1997 |

* cited by examiner

Primary Examiner—John Sipos
(74) Attorney, Agent, or Firm—Baker & Daniels

(57) ABSTRACT

A heat sealing and cutting mechanism to form a heat seal and a cut across a tube of flexible packaging material includes a carrier to contact the tube. A pair of closely spaced heat sealing bands are disposed on the carrier and are energizable to form closely spaced heat seals across the tube when the carrier is in contact with the tube. The heat sealing bands are configured to define temperature gradients along the heat sealing bands. A cutting wire is also disposed on the carrier and is positioned between the heat sealing bands. The cutting wire is energizable to cut the tube when the carrier is in contact with the tube.

33 Claims, 11 Drawing Sheets

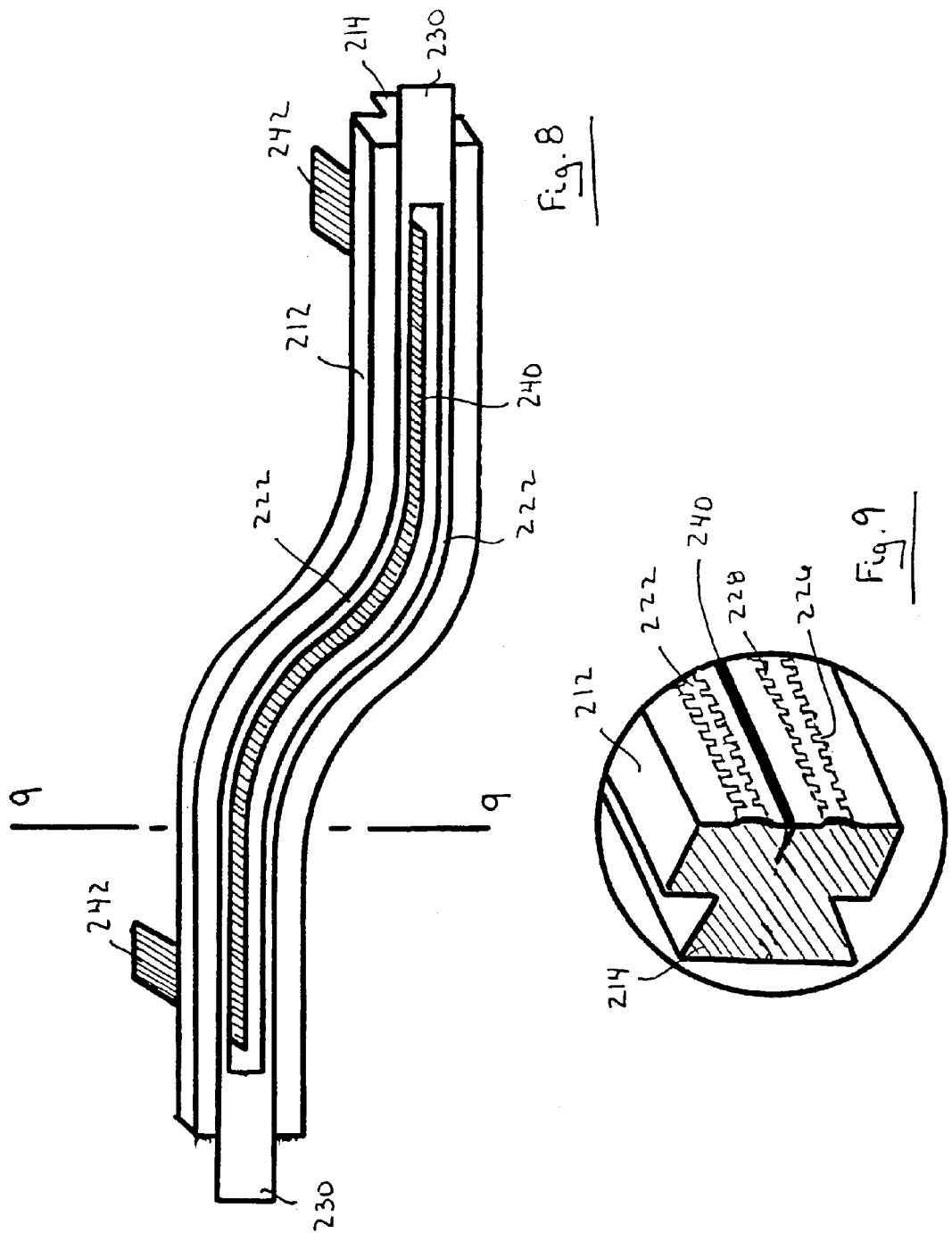

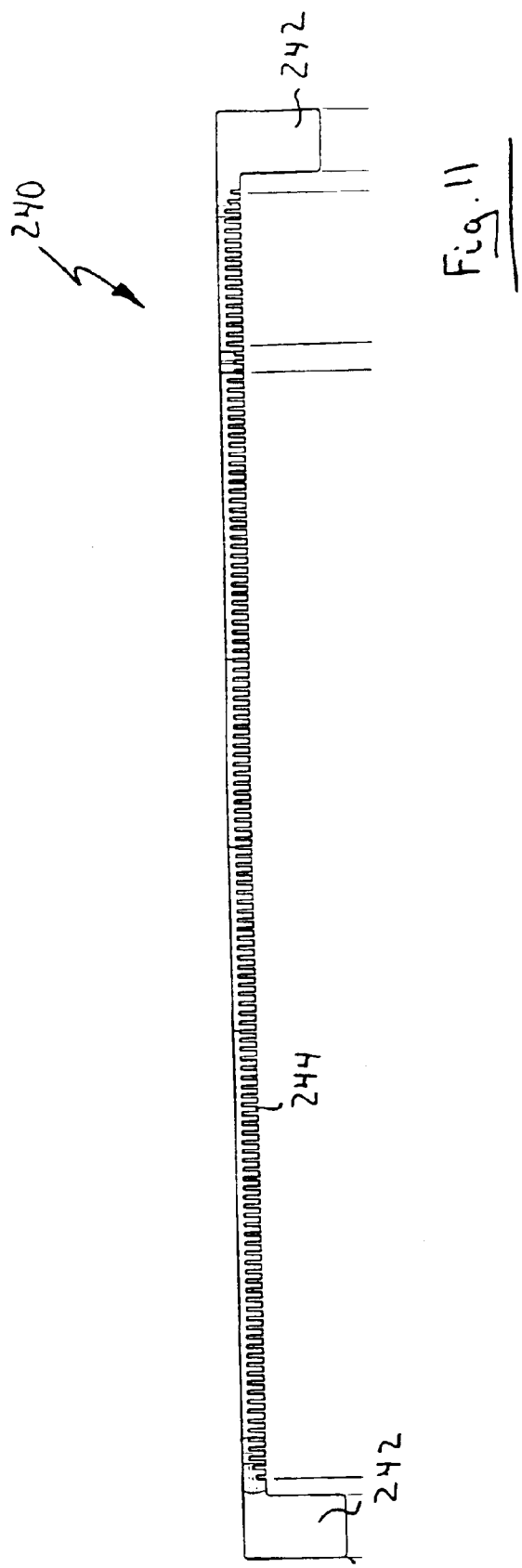

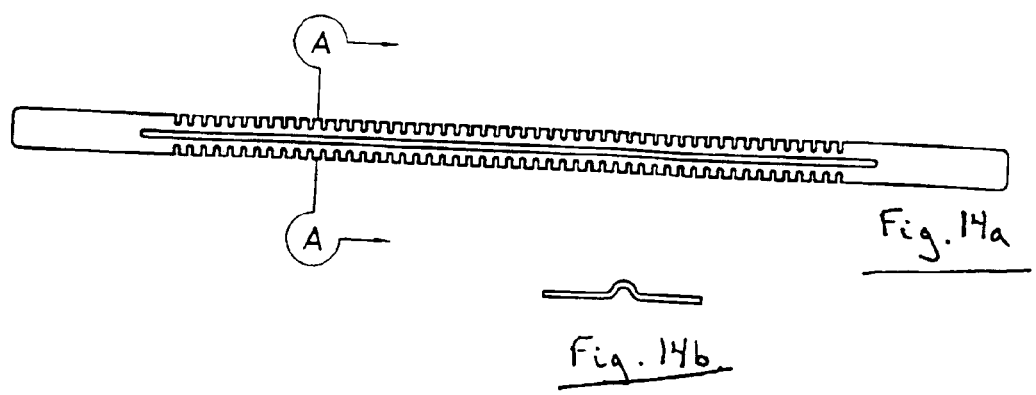
Fig. 14a
Fig. 14b
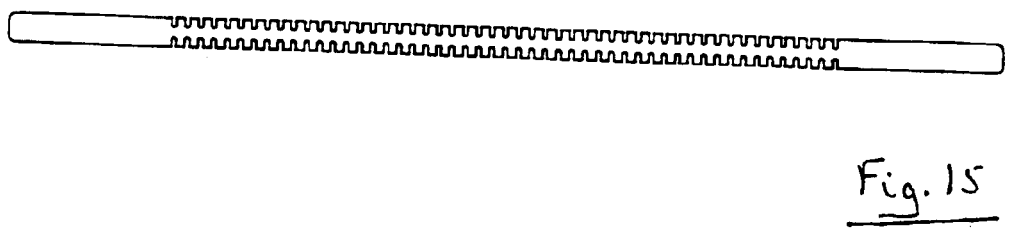
Fig. 15

HEAT SEALING AND CUTTING MECHANISM AND CONTAINER FORMING APPARATUS INCORPORATING THE SAME

CROSS-RELATED APPLICATION

This application claims the benefit of U.S. patent application No. 60/247,358, filed on Nov. 13, 2000.

FIELD OF THE INVENTION

The present invention relates to packaging and in particular to a heat sealing and cutting mechanism and a container forming apparatus incorporating the same. The present invention also relates to a heat sealing blade.

BACKGROUND OF THE INVENTION

Form, fill and seal packaging machines to form fluid filled containers from a tube of flexible packaging material are known in the art. For example, U.S. Pat. No. 4,747,253 to Schulte discloses an apparatus for the proportion of fluid contents during the manufacture of packing containers. The apparatus includes a filling tube extending into a tube of laminated packaging material to deliver milk into the tube of packaging material. A sealing mechanism below the filling tube forms transverse seals across the tube of packaging material to divide the tube of packaging material into individual cushion-shaped packing containers. Cuts are then formed along the seals to separate the individual packing containers. A gas feed pipe is connected to the filling tube to introduce gas into the tube of packaging material to express air before the individual packing containers are formed so that gas is trapped in each packing container as it is formed. The amount of gas introduced into the tube of packaging material is the same as the volume of the air space provided in the individual packing containers. Unfortunately, gas and/or air in the packing container tends to decrease the product life of the milk introduced into the packing containers.

It has also been considered to use a resistive wire to form transverse seals across a fluid filled tube and cut the tube along the seals simultaneously to separate individual, fluid filled containers from the tube. The ends of the resistive wire are held by pivoting arms which are biased outwardly to apply a longitudinal bias to the resistive wire. In operation, when it is desired to seal and cut the tube, the resistive wire is energized causing the resistive wire to heat rapidly. As the resistive wire heats, it expands. The pivoting arms, which are biased outwardly, take up the slack in the resistive wire thereby maintaining its shape. The resistive wire is then brought into contact with the tube to form a seal across the tube and at the same time cut through the tube along the seal.

Although the above-described prior art methods allow seals to be formed across a fluid filled tube, these methods are only suitable when the seals to be formed across the tube are orthogonal to the longitudinal axis of the tube. In the Schulte method, the sealing and cutting steps are performed at two different stations. However, in situations where seals to be formed across the tube are not orthogonal to the longitudinal axis of the tube, it is important to seal and cut the tube at one station. This is due to the fact that the hydraulic forces acting on the seal by the fluid in the tube above the seal are unevenly distributed along the seal. If the tube is released after the seal is formed, the uneven hydraulic forces tend to move the tube off of its original plane making it difficult to regain control of the tube and subsequently form a cut across the tube along the seal.

Although the resistive wire method allows the tube to be sealed and cut simultaneously, it is also only suitable when orthogonal seals are to be formed across thin film packaging material. This is due to the fact that it is difficult to maintain the shape of the resistive wire and control the pressure required for the resistive wire to seal and cut thicker or laminated packaging material.

An alternative apparatus to form fluid filled containers is disclosed in International Application No. PCT/CA96/00783 published on Jun. 5, 1997 under publication No. WO 97/19852 for an invention entitled "Container With Dispensing Spout And Method For Making Same" and assigned to the assignee of the present invention. Each fluid filled container formed by the apparatus includes a body having an internal reservoir and a narrow, integral dispensing spout extending centrally from the body. The apparatus includes a filling tube extending into a tube of packaging material to deliver fluid into the tube of packaging material. A heat sealing mechanism having upstream and downstream heat sealing bars forms spaced, curvilinear heat seals across the tube of packaging material defining opposite sides of a container. A fluid displacement mechanism in the form of a cylindrical post is associated with each heat sealing bar.

In operation, a heat seal is initially formed at the bottom of the tube of packaging material allowing fluid to be delivered into the tube of packaging material via the filling tube. The fluid level in the tube of packaging material is maintained above the heat sealing bars so that when the curvilinear seals are formed across the tube of packaging material, the resulting containers are filled with fluid and void of air and/or other gasses. Once fluid has been delivered to the tube of packaging material, the fluid displacement mechanism associated with the downstream heat sealing bar is brought into contact with the tube of packaging material to displace fluid upwardly. The downstream heat sealing bar is then brought into contact with the tube of packaging material to form a heat seal thereacross through the fluid in the tube of packaging material. The heat seal is then cut to separate the container from the tube of packaging material.

Thereafter, the fluid displacement mechanism associated with the upstream heat sealing bar is brought into contact with the tube of packaging material to displace fluid upwardly. The upstream heat sealing bar is then brought into contact with the tube of packaging material to form a heat seal thereacross and the heat seal is cut to separate the container from the tube of packaging material. Once this has been done, the tube of packaging material is indexed and the process is performed again to form successive, alternately oriented, interlocked, fluid filled containers. The fluid displacement mechanisms displace sufficient fluid prior to forming the heat seals so that the containers can be made self-supporting and so that the volume of fluid in each container is generally less than or equal to the volume of the reservoir. In this manner, the spouts can be devoid of fluid allowing the spouts to be folded over and releasably attached to the bodies.

European Patent Application No. 99307700.7 published on Apr. 26, 2000 under number 0 995 683 discloses alternative heat sealing and cutting mechanisms for a container forming apparatus. Similar to the apparatus disclosed in International Application No. PCT/CA96/00783, the container forming apparatus includes a filling tube extending into a tube of packaging material to deliver fluid into the tube of packaging material. Heat sealing and cutting mechanisms form spaced, curvilinear heat seals across the tube of packaging material defining opposite sides of a container and then cut the tube along the heat seals to separate individual containers from the tube. Each heat sealing and cutting mechanism includes a carrier supporting a pair of closely spaced heat sealing bands. The carrier also supports a resistive cutting wire centrally disposed between the heat sealing bands. When the carrier is brought into contact with the tube to trap the tube between the carrier and a backing plate, the heat sealing bands are energized to form two closely spaced seals across the tube. After the seals have been formed, the heat sealing bands are de-energized and the resisitive wire is energized to cut the tube between the closely spaced seals.

Although these container forming apparatuses overcome problems associated with conventional container forming apparatuses by forming fluid filled containers devoid of air and/or other gasses, which extends product life, it has been difficult to control precisely the temperature of the heat sealing bars or heat sealing bands to suit the packaging material being sealed. As a result, when dealing with laminated and/or co-extruded multi-layered packaging films, the heat sealing and cutting mechanisms have not yielded high integrity seals consistently over long run cycles. Accordingly, improvements to container forming apparatuses of this nature are sought.

It is therefore an object of the present invention to provide a novel heat sealing and cutting mechanism and container forming apparatus incorporating the same. It is also an object of the present invention to provide a novel heat sealing blade.

SUMMARY OF THE INVENTION

According to one aspect of the present invention there is provided a heat sealing and cutting mechanism to form a heat seal and a cut across a tube of flexible packaging material, said heat sealing and cutting mechanism comprising:

a carrier to contact said tube;

a pair of closely spaced heat sealing bands on said carrier, said heat sealing bands being energizable to form closely spaced heat seals across said tube when said carrier is in contact with said tube and said heat sealing bands are energized, said heat sealing bands being configured to define temperature gradients therealong; and a cutting element on said carrier and disposed between said heat sealing bands, said cutting element being energizable to cut said tube when said carrier is in contact with said tube.

In a preferred embodiment, the heat sealing bands are vulcanized onto an electrically insulated backing that is affixed to the carrier. Each heat sealing band has indentations formed in its sides at spaced locations to define two sets of fins or teeth. The indentations formed in each side are aligned so that the fins of each set are aligned.

Preferably, the cutting wire is also vulcanized in the backing. The undersurface of the cutting wire is serrated to define a set of spaced teeth. The teeth are embedded in the backing so that the cutting wire presents a cutting edge in front of the backing.

According to another aspect of the present invention there is provided a heat sealing and cutting station for a container forming apparatus to form heat seals and cuts across a fluid filled tube of flexible packaging material at longitudinally spaced locations, said heat sealing and cutting station comprising:

a heat sealing and cutting mechanism including:
  a carrier to contact said tube;
  a pair of closely spaced heat sealing bands on said carrier, said heat sealing bands being energizable to form closely spaced heat seals across said tube when said carrier is in contact with said tube and said heat sealing bands are energized, said heat sealing bands being configured to define temperature gradients therealong when energized; and
  a cutting wire on said carrier and disposed between said heat sealing bands, said cutting wire being energizable to cut said tube when said carrier is in contact with said tube;

a support on which said carrier is mounted on one side of said tube, said support being movable between a retracted position where said carrier is spaced from said tube and an extended position where said carrier is in contact with said tube;

a backing plate on an opposite side of said tube, said backing plate being aligned with said carrier and being movable between a retracted position spaced from said tube and an extended position in contact with said tube; and a drive operable on said support and said backing plate to move said carrier and backing plate between the retracted positions where said tube is free and said extended positions where said tube is trapped between said carrier and backing plate.

According to yet another aspect of the present invention there is provided a heat sealing and cutting station for a container forming apparatus to form heat seals and cuts across a tube of flexible packaging material at longitudinally spaced locations, said heat sealing and cutting station comprising:

at least one set of jaws moveable between an open position where said tube is free and a closed position where said tube is trapped between said jaws;

a heat sealing and cutting mechanism carried by one of said jaws, said heat sealing and cutting mechanism including:
  a pair of curved, closely spaced heat sealing bands mounted onto an electrically insulating backing, said heat sealing bands being energizable to form closely spaced heat seals across said tube when said one jaw is in contact with said tube and said heat sealing bands are energized, said heat sealing bands being configured to define temperature gradients thereal-ong when energized; and
  a cutting element on said one jaw and disposed between said heat sealing bands, said cutting element being energizable to cut said tube when said carrier is in contact with said tube; and at least one power supply to energize said heat sealing bands and said cutting wire.

According to still yet another aspect of the present invention there is provided a heat sealing blade formed of electrically conductive material comprising:

an elongate body having opposite sides; and a set of spaced fins extending from at least one side of said body.

The present invention provides advantages in that the tube of packaging material can be sealed effectively even when the tube of packaging material is in the form of a laminate. This is due to the fact that since the heat sealing bands are configured to define temperature gradients along their lengths and across their widths, the temperature gradients reach the optimum sealing temperature of the laminate. Also, the present invention provides advantages in that the cutting wire ensures a clean cut through the tube between the closely spaced seals thereby avoiding the formation of "angel hair". In addition since the heat sealing and cutting mechanisms are disposed on a set of jaws, the cycle rate of the form, fill and seal machine can be increased as compared to prior art machines.

BRIEF DESCRIPTION OF THE DRAWINGS

Embodiments of the present invention will now be described more fully with reference to the accompanying drawings in which:

FIG. 8 is a side elevational view of another portion of one of the heat sealing and cutting mechanisms of FIG. 4;

FIG. 9 is a cross-sectional view of FIG. 8 taken along line 9—9;

FIG. 11 is a plan view of a cutting wire forming part of the lower heat sealing and cutting mechanism of FIG. 4;

FIGS. 14a and 14b are side elevational and cross-sectional views of yet another embodiment of a heat sealing blade; and FIG. 15 is a front elevational view of still yet another embodiment of a heat sealing blade.

DETAILED DESCRIPTION OF THE PREFERRED EMBODIMENT

Figure 1:
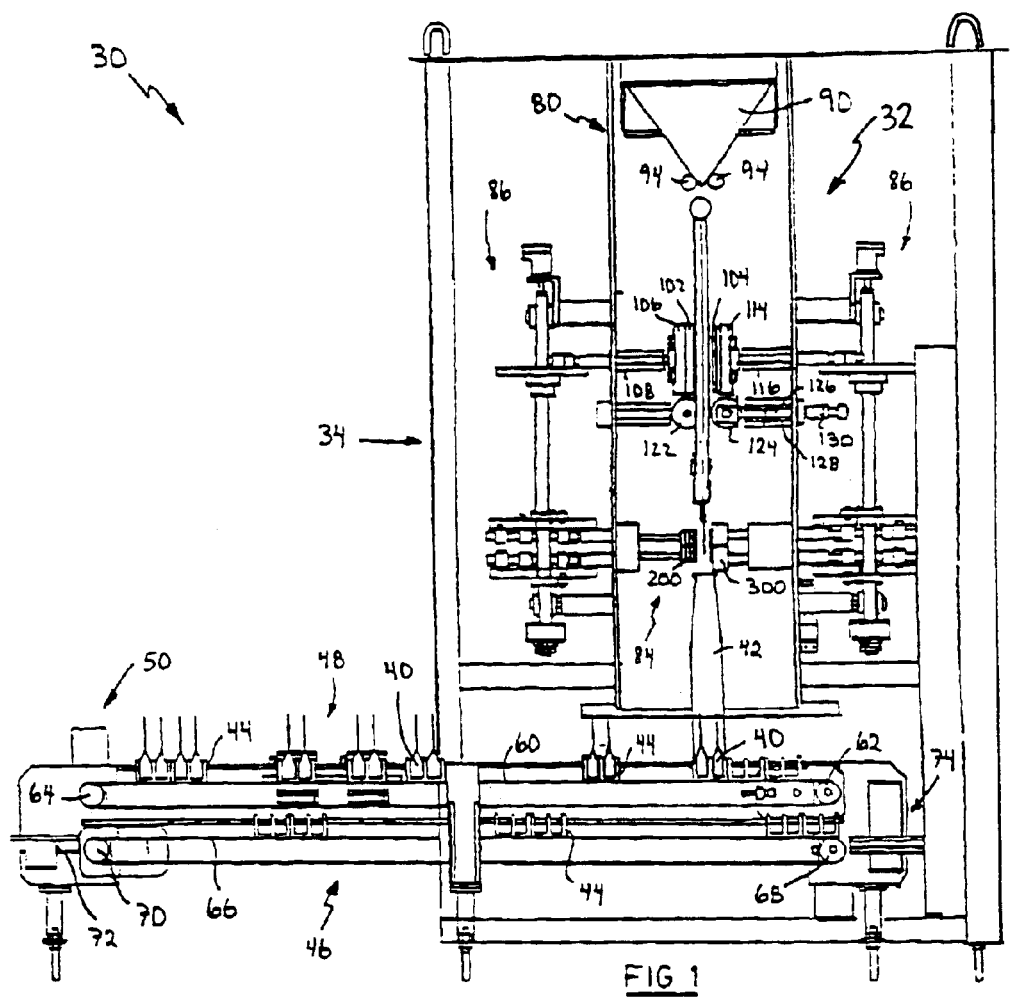
FIG. 1 is a schematic front elevational view of a container forming and delivery system including a container forming apparatus in accordance with the present invention.
Figure 2:
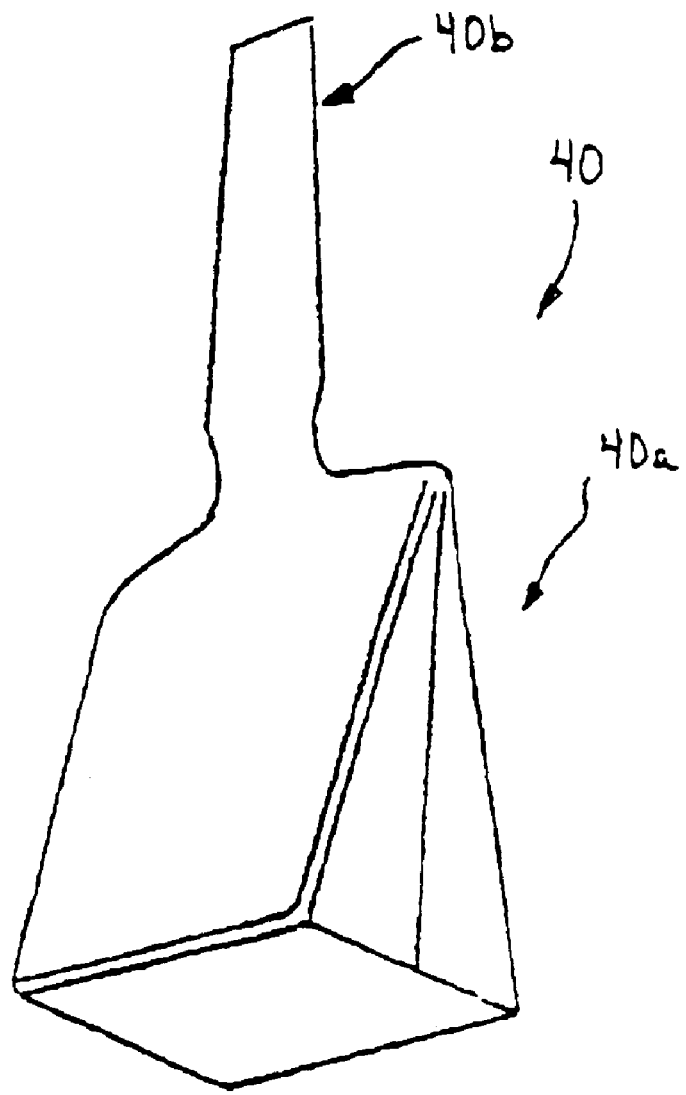
FIG. 2 is a perspective view of a container formed by the container forming apparatus of FIG. 1.
Figure 3:
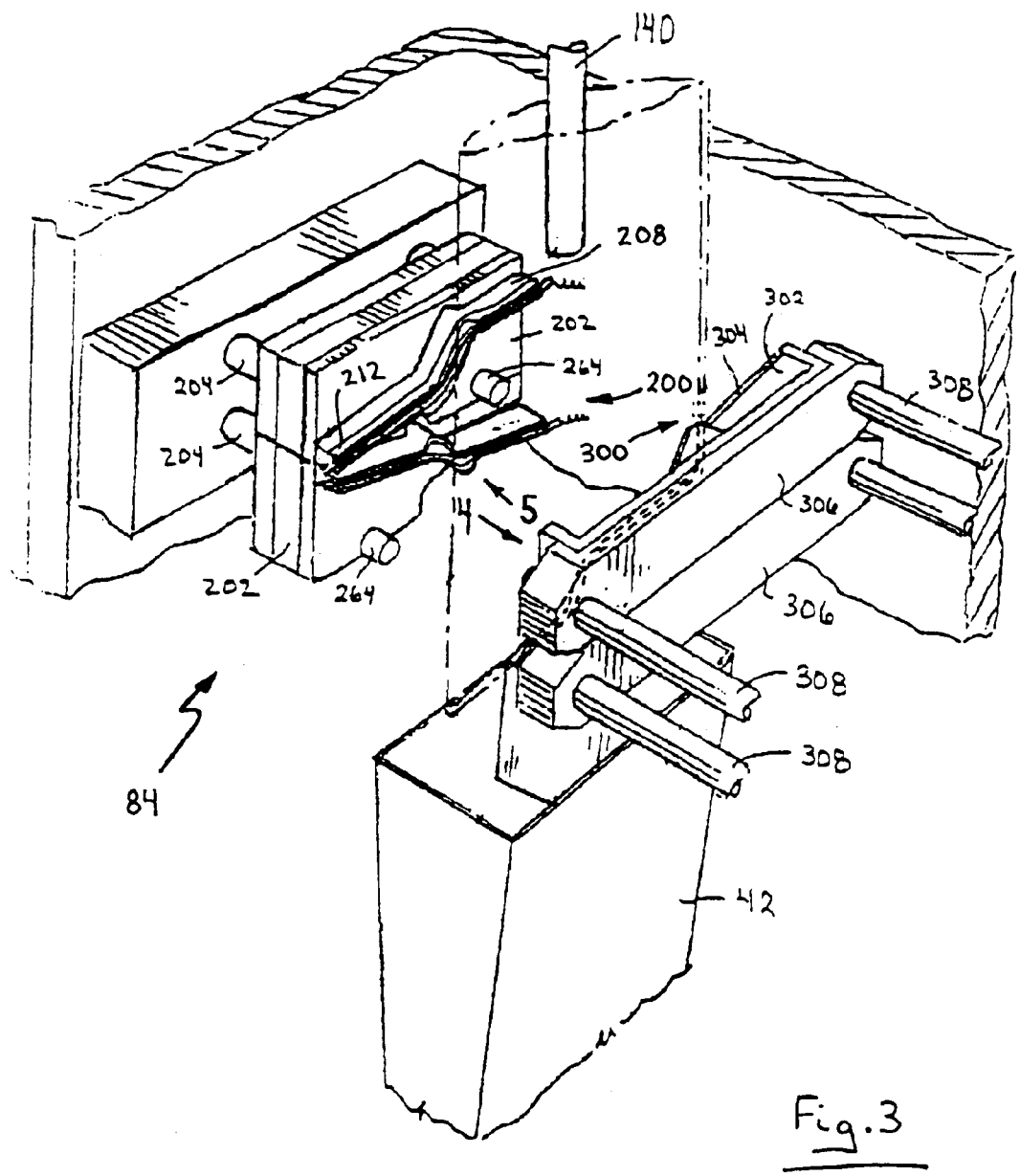
FIG. 3 is simplified perspective view of a container forming station forming part of the container forming apparatus of FIG. 1.
Figure 4:
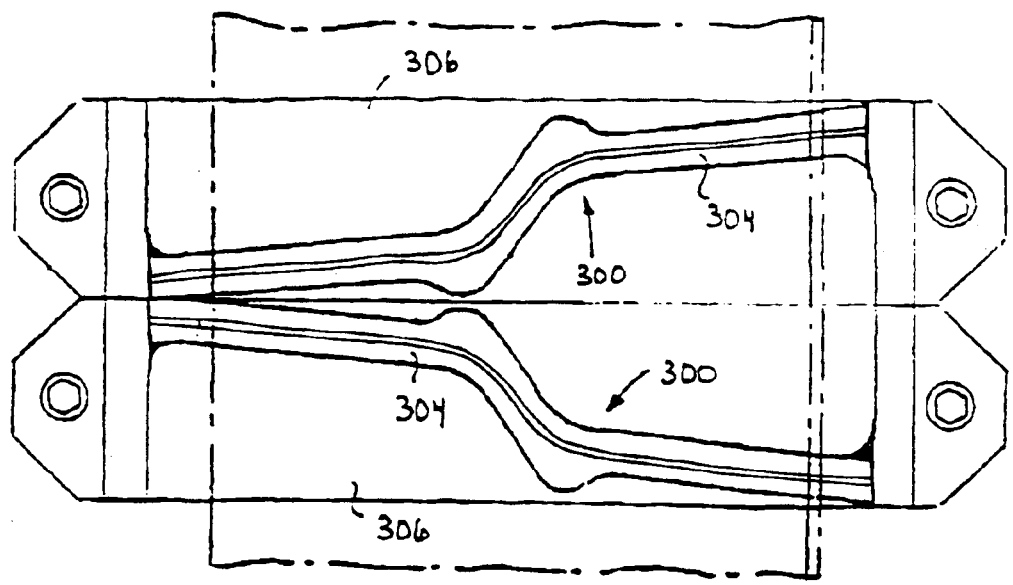
FIG. 4 is a side elevational view of upper and lower backing plates forming part of the container forming station of FIG. 3 taken in the direction of arrow 4.
Figure 5:
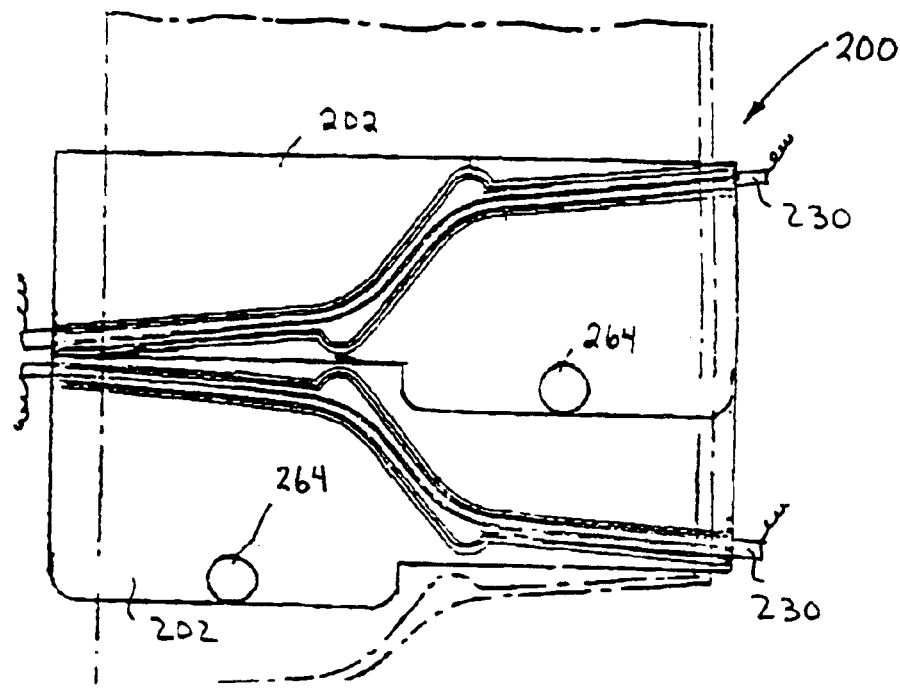
FIG. 5 is a side elevational view of upper and lower heat sealing and cutting mechanisms forming part of the container forming station of FIG. 3 taken in the direction of arrow 5.
Figure 6:
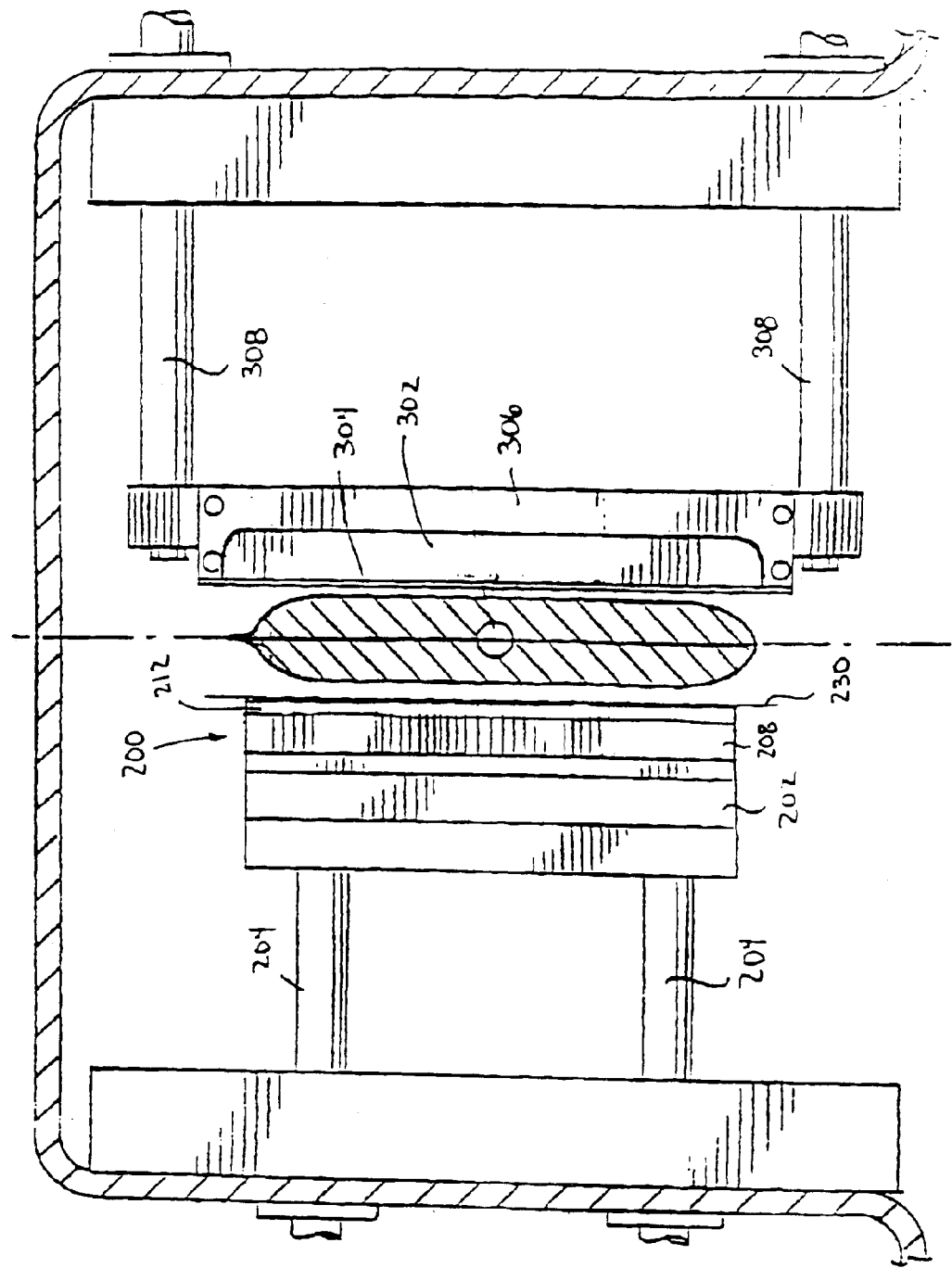
FIG. 6 is a part plan sectional view of the container forming station of FIG. 3 in an indexing condition, showing the lower heat sealing and cutting mechanism and lower backing plate in an open condition.
Figure 7:
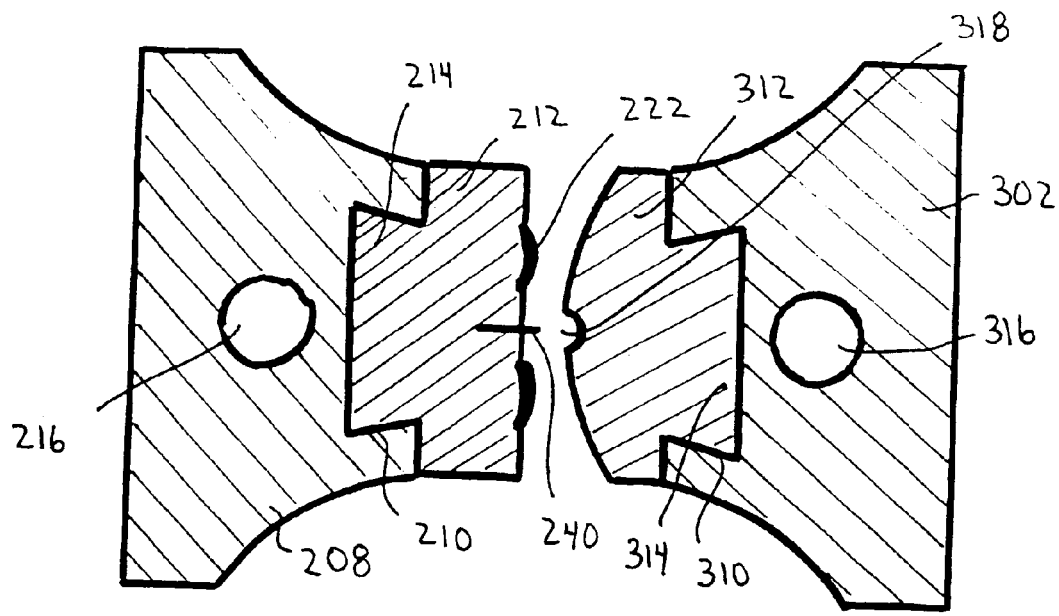
FIG. 7 is a cross-sectional view of a portion of one of the heat sealing and cutting mechanisms and one of the backing plates of FIG. 4.
Figure 12:
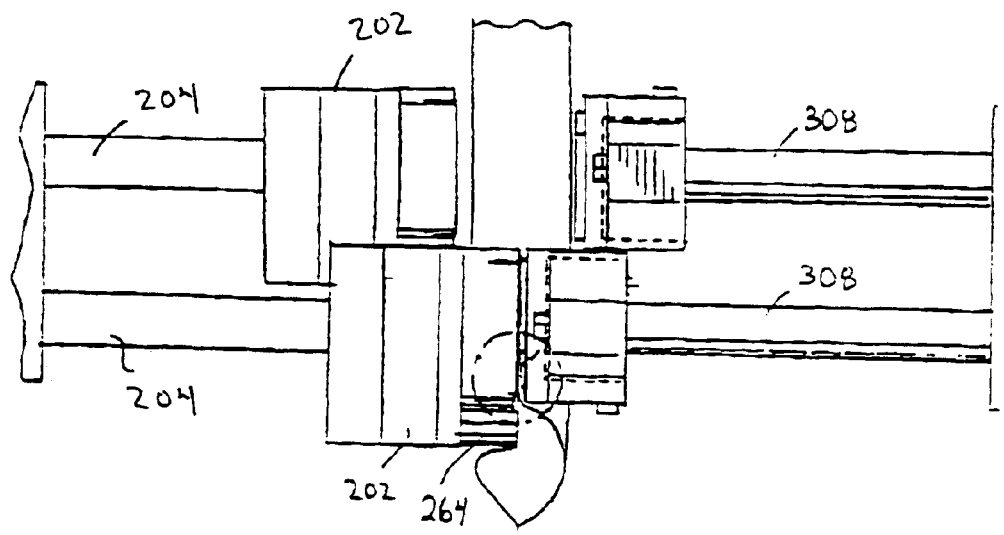
FIG. 12 is a front elevational view with the lower heat sealing and cutting mechanism and the lower backing plate in a clamped condition trapping the tube of packaging material therebetween.
Figure 10:
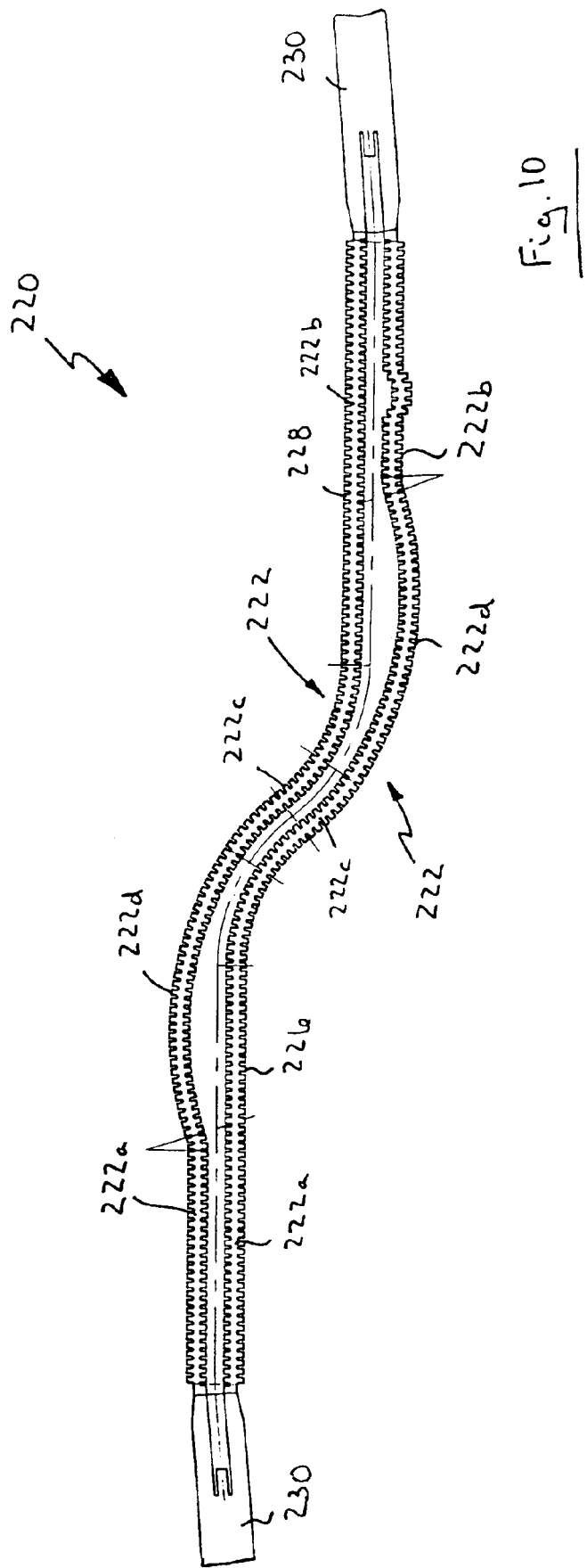
FIG. 10 is a side elevational view of a heat sealing blade forming part of the lower heat sealing and cutting mechanism of FIG. 4.

Referring now to FIGS. 1 and 2, a container forming and delivery system is shown and is generally indicated to by reference numeral 30. As can be seen, system 30 includes a container forming apparatus 32 mounted on a frame assembly 34 and receiving a web of flexible packaging material unwound from a roll (not shown). In the present embodiment, the packaging material is formed of laminated and/or co-extruded multi-layer plastic films. Currently, films of this nature seal within a temperature range from about 95° to 115° F. depending on the type of film. The roll of packaging material is supported on a motor driven shaft (not shown), which when rotated delivers packaging material to the container forming apparatus 32. Container forming apparatus 32 is of the form, fill and seal type and is operable to form individual fluid filled containers 40 (best seen in FIG. 2) from the web of packaging material. A diverter 42 is positioned below the container forming apparatus 32 and delivers the containers 40 to carriers 44 disposed on a conveyor system 46. The conveyor system 46 transports laden carriers 44 to a heat sealing station 48 where the containers 40 are made self-supporting. From station 48, the conveyor system 46 transports the containers 40 to an unloading station 50 where the containers are removed from the carriers 44. The conveyor system 46 then returns the empty carriers 44 to the diverter 42. Since the diverter 42 and the heat sealing station 48 are described in European Patent Application No. 99307707.7, further details will not be described herein.

The conveyor system 46 includes an endless delivery belt 60 wound around head and tail pulleys 62 and 64 respectively. The delivery belt 60 is disposed below and extends from the diverter 42 to the unloading station 50. An endless return belt 66 is also wound around head and tail pulleys 68 and 70 respectively and is positioned beneath the delivery belt 60. Elevators 72 and 74 are positioned at each end of the conveyor system 46. Elevator 72 transports carriers 44 from the delivery belt 60 at the unloading station 50 to the return belt 66 while elevator 74 transports carriers on the return belt 66 to the delivery belt 60 adjacent the diverter 42.

The container forming apparatus 32 includes a tube forming station 80 receiving the web of packaging material unwound from the roll. The tube forming station 80 folds and seals the web to form an open tube. A container forming station 84 is positioned below the tube forming station 80. The container forming station 84 forms spaced seals across the tube of packaging material to form individual, fluid filled containers 40 and separates the individual containers from the tube. A drive mechanism 86 synchronizes the operation of the tube forming station 80 and the container forming station 84.

The tube forming station 80 receives the web of packaging material unwound from the roll and includes a folding plate 90 over which the web of packaging material is drawn to fold the web of packaging material over itself. A pair of guide rollers 94 are positioned adjacent the bottom of the folding plate 90 and contact opposite sides of the folded web. The rollers 94 pull the free edges of the web of packaging material together to inhibit the web from traveling. The folded web of packaging material is then fed to a heat sealing mechanism 100, which in turn heat seals the free edges of the folded web of packaging material thereby to form a tube.

The heat sealing mechanism 100 includes a vertical, constant heat sealing bar 102 on one side of the web and a corresponding backing plate 104 on the other side of the web. The heat sealing bar 102 and backing plate 104 are aligned with the free edges of the web of packaging material. The heat sealing bar 102 is mounted on a support 106 secured to a cam driven shaft 108 forming part of drive mechanism 86. The backing plate 104 is also mounted on a support 114 secured to a cam driven shaft 116 forming part of drive mechanism 86. The drive mechanism 86 is actuable to reciprocate the heat sealing bar 102 and backing plate 104 between retracted inoperative positions where they are spaced apart and extended operative positions where they are in contact with the overlying free edges of the folded web of packaging material trapped therebetween.

Below the heat sealing mechanism 100 is a pair of driven, rubber pull rollers 122 and 124 respectively contacting opposite sides of the tube of packaging material. The pull roller 122 is mounted on the frame assembly 34 and is in a fixed position. The pull roller 124 is secured to a piston 126 extending from a cylinder 128 of a pneumatic drive 130 and is biased towards pull roller 122 so that the tube of packaging material is grabbed by the pull rollers 122 and 124 allowing it to be advanced towards the container forming station 84.

The container forming station 84 forms heat seals across the tube of packaging material at spaced locations to define opposite sides of containers and cuts the tube adjacent the heat seals to separate individual containers 40 from the tube. The heat seals are configured so that successive containers 40 formed from the tube of packaging material are alternately oriented and interlocked to reduce packaging material waste. As can be seen in FIG. 2, each container 40 includes a body 40a having an internal reservoir and an integral, narrow dispensing spout 40b extending generally centrally from the body. The spout 40b tapers towards its distal end. Opposed projections (not shown) are formed on the internal wall of the spout 40b adjacent the juncture between the reservoir and the spout. The projections and the dimensions of the spout 40b give an individual control over the velocity of out-flowing fluid. Further details of the container 40 can be found in U.S. Pat. No. 5,800,062 issued on Sep. 1, 1998, and assigned to the assignee of the present invention.

Referring now to FIGS. 3 to 11, the container forming station 84 is better illustrated. As can be seen, the container forming station includes upper and lower heat sealing and cutting mechanisms 200 positioned on one side of the tube of packaging material. The heat sealing and cutting mechanisms 200 are moveable between retracted and extended positions. Each heat sealing and cutting mechanism 200 is mounted on a support 202 that is driven by cam driven shafts 204 forming part of the drive mechanism 86.

One of the heat sealing and cutting mechanisms is better illustrated in FIGS. 7 to 11. As can be seen, each heat sealing and cutting mechanism 200 includes a curvilinear carrier 208 formed of hard anodized aluminum to render the carrier non-electrically conductive. A tail 210 is formed in the forward surface of the carrier 208 and accommodates a silicon rubber backing 212 moulded with a dove 214. A cooling channel 216 is provided in the carrier 208 and extends along its length to permit for the flow of coolant. The carrier 208 and silicon rubber backing 212 are generally in the shape of a "lazy-S".

A heat sealing blade 220 formed of electrically conductive material (best seen in FIG. 10) is vulcanized onto the forward facing surface of the silicon rubber backing 212. The heat sealing blade 220 includes a pair of closely spaced heat sealing bands 222 each having a slight convex shape. The heat sealing bands 222 are joined at their ends by tabs 230. The heat sealing bands 222 extend the length of the silicon rubber backing 212, with each heat sealing band following an opposite side edge of the silicon rubber backing 212. Thus, each heat sealing band 222 includes upper and lower arms 222a and 222b respectively, joined by a bridge 222c. A bulge 222d is provided at one of the turns of each heat sealing band 222. The bulges 222d define opposed projections within the spouts 40b of the containers 40.

Each heat sealing band 222 also has indentations or notches 226 formed in its sides at spaced locations to define two sets of generally rectangular fins 228 extending from opposite sides of the band body. The indentations 226 in each side of the heat sealing band 222 are aligned so that the fins 228 are aligned. The spaced indentations 226 define alternating regions of relatively high and low electrical resistance along the length of the heat sealing band 222. As a result, when the heat sealing band is energized, the alternating regions of high and low electrical resistance create alternating cold and hot spots along the heat sealing band 222. Temperature gradients are therefore created between the hot and cold spots. The fins 228 provide for the dissipation of heat away from the center of the heat sealing band 222 to define a temperature gradient across the width of the heat sealing band. The range of the temperature gradients are determined by the sizes and locations of the indentations 226. The tabs 230 of the heat sealing blade 220, which extend beyond the silicon rubber backing 212, are connected to a power supply (not shown) to allow the heat sealing blade 220 to be energized.

A resistive cutting element or wire 240 formed of electrically conductive material (best seen in FIG. 11) is also vulcanized into the silicon rubber backing 212. The cutting wire 240 is centrally disposed between the heat sealing bands 222 and extends slightly beyond the forward facing surface of the silicon rubber backing 212 to define a leading cutting edge. The cutting wire 240 has a depending tab 242 at each of its ends. The tabs 242 extend through the silicon rubber backing 212 and the carrier 208 and are connected to a power supply (not shown) to allow the cutting wire 240 to be energized. The undersurface of the cutting wire is serrated to define a set of teeth 244. The spaced teeth 244 also define alternating regions of high and low electrical resistance resulting in hot and cold spots along the length of the cutting wire 240 when the cutting wire is energized. The teeth 244, which create the cold spots, are embedded in the silicon rubber backing 212 to reduce the amount of heat that is transferred to the silicon rubber backing when the cutting wire 240 is energized.

A generally cylindrical, hydraulic equalization post 264 is also provided on the support 202. The hydraulic equalization post 264 is generally in line with the lower arm of the carrier 208 defining the spout of the container being formed.

On the opposite side of the tube of packaging material in line with the heat sealing and cutting mechanisms are corresponding upper and lower backing plates 300. Each backing plate 300 is aligned with and corresponds in shape to a respective one of the heat sealing and cutting mechanisms 200. Each backing plate 300 includes a carrier 302 mounted on a support 306. A tail 310 is formed in the forward facing surface of the carrier 302 and accommodates a silicon rubber backing 312 moulded with a dove 314. A cooling channel 316 is provided in the carrier 302 and extends along its length to permit for the flow of coolant. The silicon rubber backing 312 is convex and has a central groove 318 formed in its forward facing surface that is aligned with the cutting wire 240.

Each support 306 is driven by cam driven shafts 308 forming part of the drive mechanism 86. The upper and lower heat sealing and cutting mechanisms and the upper and lower backing plates function as jaws, which trap and release the tube of packaging material as will be described.

The operation of the container forming and delivery system 30 will now be described. As the web material is unwound from the roll by rotating the motor driven shaft, the web material is delivered to the folding plate 90. The web is then pulled over the folding plate 90 which folds the web over itself. The folded web is then pulled together by the rollers 94 before being conveyed to the heat sealing station 100. At the heat sealing station, the heating sealing bar 102 and backing plate 104 are brought together by the drive mechanism 86 to sandwich the folded web and form a seal along the free overlying edges of the folded web thereby to form a tube. The heat sealing bar 102 and backing plate 104 are then retracted by the drive mechanism 86 allowing the tube of packaging material to be indexed by the pull rollers 122 and 124.

After the tube of packaging material has been advanced and assuming that a seal has been formed across the bottom of the tube of packaging material, fluid is delivered into the tube via the tube filling to fill partially the tube. Thereafter, the lower heat sealing and cutting mechanism 200 and lower backing plate 306 are extended by the drive mechanism 86 so that the silicon rubber backings 212 and 312 contact the fluid filled tube below the level of the fluid in the tube and clamp the fluid filled tube thereby to flatten the tube of packaging material in a narrow region where a seal is to be formed. The convex shape of the heat sealing bands 222 and the silicon rubber backing 312 forces fluid in the tube away from the cutting wire 240 and the heat sealing bands 222.

The hydraulic equalization post 264 on the support 202, which is generally in line with the lower arm of the carrier 208 helps to support the tube of packaging material in a direction generally orthogonal to the longitudinal axis of the tube of packaging material. The hydraulic equalization post 264 is dimensioned so that it contacts the fluid filled tube slightly before the fluid filled tube is clamped and displaces fluid in the tube of packaging material upwardly above the lower heat sealing and cutting mechanism 200 and lower backing plate 300. In this manner, the amount of fluid held in the tube of packaging material between the seal at the bottom of the tube and the lower heat sealing and cutting mechanism 200 and lower backing plate 300 is set to the desired amount. The amount of displaced fluid ensures sufficient room for the corners of the containers to be pinched to make the containers self-supporting.

With the fluid filled tube held between the silicon rubber backings 212 and 312, the heat sealing blade 220 is energized by the power supply causing the heat sealing bands 222 to heat sufficiently so that the heat sealing bands 222 form closely spaced, curvilinear heat seals across the tube of flexible packaging material. Once the seals have been formed, the heat sealing blade 220 is de-energized. The silicon backing rubbers 212 and 312 remain in position to clamp the tube of packaging material allowing the closely spaced heat seals to cool and set. Thereafter, the cutting wire 240 is energized by the power supply to heat the cutting wire to a high temperature. The cutting wire, when heated, vaporizes the tube of flexible packaging material between the closely spaced seals. During heating of the cutting wire 240, the groove 318 in the silicon rubber backing 312 allows the flexible packaging material to move away from the cutting wire 240 and bead resulting in a clean cut through the tube and avoiding the formation and accumulation of "angel hair" on the heat sealing and cutting mechanism 200.

During heating of the heat sealing bands 222 and the cutting wire 240, since the heat sealing bands and the cutting wire are vulcanized to the silicon rubber backing 212, the forces that act to straighten the heat sealing bands and cutting wire when the heat sealing bands are energized overcome. As a result, the complex shapes of the heat sealing bands 222 and cutting wire 240 are retained.

Once cut has been made, the drive mechanism 86 retracts the lower heat sealing and cutting mechanism 200 and lower backing plate 300 to release the formed container. At this stage, the upper heat sealing and cutting mechanism 200 and upper backing plate 300 are extended by the drive mechanism 86 to clamp the tube of packaging material therebetween. The same sequence of steps is then performed so that a second container is formed and separated from the tube of packaging material. Thereafter, the web of packaging material is indexed twice by the pull rollers 122 and 124 allowing the next two containers to be formed and separated from the tube of packaging material in succession.

As each container is formed and separated from the tube, each container 40 falls toward the diverter 42. The diverter diverts the containers to different seats of the carrier 44 positioned below the diverter 42. Once the containers are positioned in the seats of the carrier 44, the delivery belt 60 is driven to advance the carrier to the station 48 where the corners of the containers are pinched and then folded or removed to make the containers self-supporting.

Following this, the delivery belt 60 is driven to deliver the self-supporting containers to the unloading station 50 where the containers are removed from the carriers 44. Once emptied, the carriers 44 are carried by the elevator 72 to the return belt 66 allowing the return belt to deliver the carriers to the elevator 74 so that the carriers 44 can be placed back on the delivery belt 60 adjacent the container forming apparatus 32. The above operation can be performed at a high speed allowing fluid filled containers to be formed quickly.

Although during the heat sealing and cutting operation, the heat sealing blade 220 is described as being energized first to seal the tube, the heat sealing blade 240 and the cutting wire 240 can be energized simultaneously to seal and cut the tube of packaging material virtually at the same time. This operation is convenient when the fluid being introduced into the tube of packaging material is cold since the cold fluid helps to set the seals. In aseptic packaging where fluids are at higher temperatures, a dwell between the time the heat seals are formed and the time the tube of packaging material is cut is preferred to allow the seals to set and ensure their integrity.

Since the heat sealing bands 222 are configured to define temperature gradients along their lengths and widths, the heat sealing bands achieve the optimum sealing temperature to form high integrity seals across the tube of flexible packaging material without having to control precisely the temperature of the heat sealing bands and verify that the sealing temperature for the packaging material was attained. The heat sealing bands 222 simply must be heated so that the temperature gradients at least reach the optimum temperature for sealing the packaging material.

Although the fins 228 have been described as being generally rectangular, those of skill in the art will appreciate that other fin configurations can be used. Of course, the shape and the dimension of the fins will have an effect on the temperature gradients that are created along and across the heat sealing bands 222 when the heat sealing bands are energized.

Figure 13:
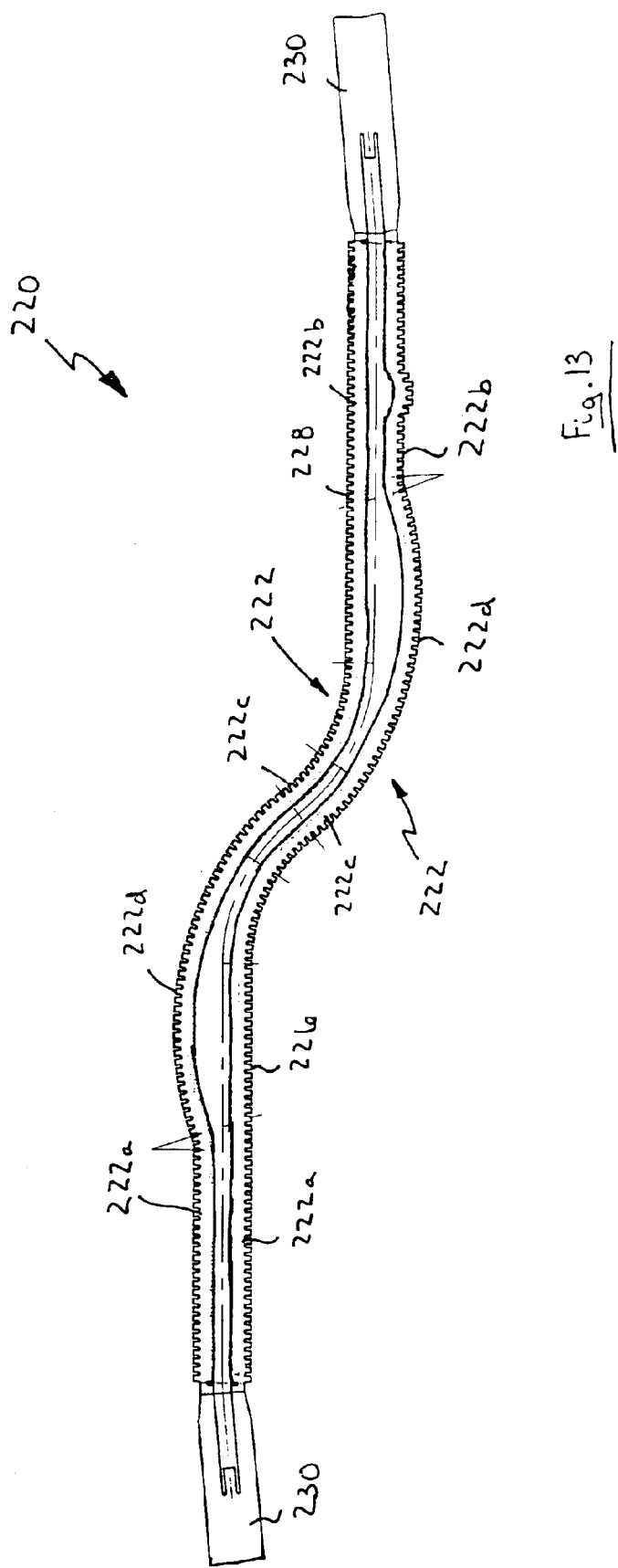
FIG. 13 is a side elevational view of an alternative embodiment of a heat sealing blade.

Also, the fin arrangement of the heat sealing bands 222 can be changed provided the desired temperature gradient is maintained. For example, as shown in FIG. 13, indentations or notches 226 need only be provided along one side of the heat sealing band.

Although each heat sealing band is shown having a complex lazy "S" shape, other heat sealing band configurations can be used depending on the type of seal to be formed across the tube of flexible packaging material. For example, if straight transverse seals are to be formed across the tube and the tube is to be cut, the healing sealing blade illustrated in FIGS. 14a and 14b can be used. If only straight transverse seals are to be formed across the tube, the healing sealing blade illustrated in FIG. 15 can be used.

The present invention provides advantages in that non-orthogonal seals can be formed across the tube and then cut cleanly, quickly and in a controllable fashion. Virtually any type of multi-layered or laminated flexible packaging material can be sealed and cut using the present method without requiring large pressures to be applied to the flexible packaging to support the tube during sealing and cutting.

The present invention provides further advantages in that seals produced by the heat sealing bands have improved consistency of strength due to the fact that the temperature gradients created along the heat sealing bands ensure the sealing temperature of the packaging material is reached.

Although preferred embodiments of the present invention have been described, those of skill in the art will appreciate that variations and modifications may be made without departing from the spirit and scope thereof as defined by the appended claims.

What is claimed is:

1. A heat sealing and cutting mechanism to form a heat seals and a cut across a tube of flexible packaging material, said heat sealing and cutting mechanism comprising:
   a carrier to contact said tube;
   a pair of closely spaced heat sealing bands on said carrier, said heat sealing bands being energizable to form closely spaced heat seals across said tube when said carrier is in contact with said tube and said heat sealing bands are energized; and
   a cutting element on said carrier and disposed between said heat sealing bands, said cutting element being energizable to cut said tube when said carrier is in contact with said tube, an undersurface of said cutting element being serrated to define a set of spaced teeth, said teeth being embedded in an electrically insulating backing affixed to said carrier, said cutting element presenting a cutting edge in front of said backing.

2. A heat sealing and cutting mechanism according to claim 1 wherein said heat sealing bands are vulcanized onto said backing.

3. A heat sealing and cutting mechanism according to claim 2 wherein each heat sealing band has indentations formed in at least one side thereof at spaced locations to define a set of fins.

4. A heat sealing and cutting mechanism according to claim 3 wherein each heat sealing band has indentations formed in opposite sides thereof to define two sets of fins, the indentations formed in each side being generally aligned so as to generally align the fins of each set.

5. A heat sealing and cutting mechanism according to claim 2 wherein said cutting element is vulcanized onto said backing.

6. A heat sealing and cutting mechanism according to claim 1 wherein said heat sealing bands and said cutting element are curved.

7. A heat sealing and cutting mechanism according to claim 1 wherein the ends of said heat sealing bands are joined at tabs, said tabs extending beyond the ends of said backing and being connectable to a power supply.

8. A heat sealing and cutting mechanism according to claim 7 wherein tabs are formed at the ends of said cutting element, said cutting element tabs extending through said backing and said carrier and being connectable to a power supply.

9. A heat sealing and cutting mechanism according to claim 8 wherein said carrier is formed of anodized aluminum and said backing is formed of silicon rubber.

10. A heat sealing and cutting mechanism according to claim 1 wherein said heat sealing bands are convex.

11. A heat sealing and cutting station for a container forming apparatus to form heat seals and cuts across a fluid filled tube of flexible packaging material at longitudinally spaced locations, said heat sealing and cutting station comprising:
    a heat sealing and cutting mechanism including:
        a carrier to contact said tube;
        a pair of closely spaced heat sealing bands on said carrier, said heat sealing bands being energizable to form closely spaced heat seals across said tube when said carrier is in contact with said tube and said heat sealing bands are energized; and
        a cutting wire on said carrier and disposed between said heat sealing bands, said cutting wire being energizable to cut said tube when said carrier is in contact with said tube;
    a support on which said carrier is mounted, on one side of said tube, said support being movable between a retracted position where said carrier is spaced from said tube and an extended position where said carrier is in contact with said tube;
    a backing plate on an opposite side of said tube, said backing plate being aligned with said carrier and being movable between a retracted position spaced from said tube and an extended position in contact with said tube; and
    a drive operable on said support and said backing plate to move said carrier and backing plate between the retracted positions where said tube is free and said extended positions where said tube is trapped between said carrier and backing plate wherein an undersurface of said cutting wire is serrated to define a set of spaced teeth, said teeth being embedded in an electrically insulated backing affixed to said carrier, said cutting wire presenting a cutting edge in front of said backing.

12. A heat sealing and cutting station according to claim 11 wherein said heat sealing bands and said cutting wire are vulcanized onto said electrically insulating backing, said cutting wire being generally centrally disposed between said heat sealing bands.

13. A heat sealing and cutting station according to claim 12 wherein each heat sealing band has indentations formed in at least one side thereof at spaced locations to define a set of fins.

14. A heat sealing and cutting station according to claim 13 wherein each heat sealing band has indentations formed in opposite sides thereof to define two sets of fins, the indentations formed in each side being generally aligned so as to generally align the fins of each set.

15. A heat sealing and cutting station according to claim 11 wherein said backing plate has an electrically insulating backing thereon, said backing being convex in shape and having a groove formed therein, said groove being aligned with said cutting wire.

16. A heat sealing and cutting station according to claim 15 wherein said carrier is formed of anodized aluminum and wherein said backings are formed of silicon rubber.

17. A heat sealing and cutting station for a container forming apparatus to form heat seals and cuts across a tube of flexible packaging material at longitudinally spaced locations, said heat sealing and cutting station comprising:
    at least one set of jaws moveable between an open position where said tube is free and a closed position where said tube is trapped between said jaws;

a heat sealing and cutting mechanism carried by one of said jaws, said heat sealing and cutting mechanism including:
- a pair of curved, closely spaced heat sealing bands mounted on an electrically insulating backing, said heat sealing bands being energizable to form closely spaced heat seals across said tube when said tube is trapped between said jaws and said heat sealing bands are energized; and
- a cutting element on said one jaw and disposed between said heat sealing bands, said cutting element being energizable to cut said tube when said tube is trapped between said jaws, an undersurface of said cutting element being serrated to define a set of spaced teeth, said teeth being embedded in said backing, said cutting element presenting a cutting edge in front of said backing; and at least one power supply to energize said heat sealing bands and said cutting wire.

18. A heat sealing and cutting station according to claim 17 wherein each heat sealing band has indentations formed in at least one side thereof at spaced locations to define a set of fins.

19. A heat sealing and cutting station according to claim 18 wherein each heat sealing band has indentations formed in opposite sides thereof to define two sets of fins, the indentations formed in each side being generally aligned so as to generally align the fins of each set.

20. A heat sealing and cutting mechanism according to claim 17 wherein said heat sealing bands are convex.

21. A heat sealing and cutting mechanism according to claim 20 wherein said other jaw carries an insulating convex backing.

22. A heat sealing and cutting mechanism according to claim 21 wherein said convex backing has a groove formed therein that is aligned with said cutting element.

23. A heat sealing and cutting mechanism to form heat seals and a cut across a tube of flexible packaging material, comprising:
- a pair of members movable relative to one another between an open condition where said tube is free and a closed condition where said tube is trapped between said members;
- at least one heat sealing band on one of said members, said at least one heat sealing band presenting an outer generally convex surface facing said tube, said at least one heat sealing band forming a heat seal across said tube when said at least one heat sealing band is energized and said members are in said closed condition; and
- a cutting element on one of said members, said cutting element forming a cut across said tube when said cutting element is energized and said members are in said closed condition, an undersurface of said cutting element being serrated to define a set of spaced teeth, said teeth being embedded in a backing affixed to said one member, said cutting element presenting a cutting edge in front of said backing.

24. A heat sealing mechanism according to claim 23 wherein said at least one heat sealing band and said cutting element are vulcanized on said backing.

25. A heat sealing mechanism according to claim 24 including a pair of closely spaced heat sealing bands on said one member.

26. A heat sealing and cutting mechanism according to claim 23 wherein said at least one heat sealing band and said cutting element are on the same member.

27. A heat sealing and cutting mechanism according to claim 26 wherein said cutting element extends forwardly from said one member and wherein a second of said members has a groove therein corresponding in shape to said cutting element, said groove accommodating said cutting element when said members are in said closed condition.

28. A heat sealing and cutting mechanism according to claim 27 wherein said second member includes an insulating backing to contact said tube, said insulating backing having said groove formed therein.

29. A heat sealing and cutting mechanism to form a heat seal and a cut across a tube of flexible packaging material, comprising:
- a pair of support elements movable relative to one another between an open condition where said tube is free and a closed condition where said tube is trapped between said members;
- at least one heat sealing band on a first of said support elements, said at least one heat sealing band forming a heat seal across said tube when said at least one heat sealing band is energized and said support elements are in said closed condition;
- a cutting element on said first support element and having a serrated undersurface facing said first support element, said cutting element forming a cut across said tube when said cutting element is energized and said support elements are in said closed condition; and
- a backing on a second of said support elements, said backing having a groove formed therein aligned with said cutting element to accommodate said cutting element when said support elements are in said closed condition.

30. A heat sealing and cutting mechanism according to claim 29 wherein said backing presents a generally convex surface towards said first support element.

31. A heat sealing and cutting mechanism according to claim 30 wherein a pair of heat sealing bands are provided on said first support element and wherein said cutting element is positioned between said heat sealing bands.

32. A heat sealing and cutting mechanism according to claim 31 wherein said heat sealing bands and cutting element are curved.

33. A heat sealing and cutting mechanism according to claim 32 wherein said heat sealing bands present convex surfaces towards said backing.

* * * * *

UNITED STATES PATENT AND TRADEMARK OFFICE
CERTIFICATE OF CORRECTION

PATENT NO. : 6,871,476 B2
DATED : March 29, 2005
INVENTOR(S) : Stefan Tobolka

It is certified that error appears in the above-identified patent and that said Letters Patent is hereby corrected as shown below:

Column 12,
Line 41, delete "scaling" and insert -- sealing --.

Column 14,
Lines 4 and 21, delete "scaling" and insert -- sealing --.

Signed and Sealed this

Seventh Day of June, 2005

JON W. DUDAS
*Director of the United States Patent and Trademark Office*